United States Patent [19]

Myers et al.

[11] Patent Number: 5,290,598
[45] Date of Patent: Mar. 1, 1994

[54] PROCESS FOR APPLYING A HIGH SOLIDS COATING COMPOSITION USING A HIGH PRESSURE AIRLESS SPRAY

[75] Inventors: W. Dan Myers, Lexington; Steven M. Summey, Trinity, both of N.C.

[73] Assignee: Azko Coatings, Inc., High Point, N.C.

[21] Appl. No.: 950,438

[22] Filed: Sep. 23, 1992

[51] Int. Cl.$^5$ .............................. B05D 3/02
[52] U.S. Cl. ................... 427/384; 427/393; 427/397; 427/421; 427/422
[58] Field of Search .............. 427/384, 397, 421, 422, 427/393; 118/300

[56] References Cited

U.S. PATENT DOCUMENTS 5,027,742  7/1991  Lee et al. ........................ 118/300
5,160,766  11/1992  Waltrip et al. .................... 427/384

*Primary Examiner*—Shrive Beck
*Assistant Examiner*—David M. Maiorana
*Attorney, Agent, or Firm*—Scott R. Cox

[57] ABSTRACT

Disclosed herein is a process for a coating composition for application at extremely high pressures under conditions which significantly reduce the amount of volatile organic materials which are given off during the spray process. Preferably, the coating composition is based upon a plasticizer wet nitrocellulose lacquer. The composition is utilized in a spray process involving the filling of a spray pump receptacle with the coating wherein the spray pump is operated at pressures above about 2,750 psi and wherein the pump is provided with a temperature control means for assuring that the temperature of the pumped coating is in the range of about 65° F. to 150° F. so that the viscosity of the pumped coating is maintained in the range of about 250 to about 1,000 cps. The resulting coatings may be applied as a top coat, sealer, lacquer, etc. to any desired substrate, although wood is preferred, with the resulting finished coating being equal or superior to existing coating compositions.

9 Claims, No Drawings

PROCESS FOR APPLYING A HIGH SOLIDS COATING COMPOSITION USING A HIGH PRESSURE AIRLESS SPRAY

BACKGROUND OF INVENTION

1. Field of Invention

This invention relates to processes for applying coating compositions. More particularly, this invention relates to a process for applying a high solids coating composition using a high pressure spray system which has a low volatile organic solvent content.

2. Prior Art

The spraying of chemical coating compositions has been known for many years. Spray systems are of two basic types. The first type is the air-atomized spray system whereby air or another gas is used to atomize a coating into a fine mist which is then propelled onto the substrate to be coated. Air-based spray coatings suffer from well known deficiencies, including specifically that a high degree of overspray is often observed leading to a loss in the efficiency of use of the coating. In addition, in recent years increasing concerns have arisen about the large amounts of organic materials which are released into the atmosphere by air-atomized spraying of organic solvent containing coatings.

The second common type of spray process is the airless spray process whereby the coating itself is pressurized and this pressure is used to project the spray onto the substrate. Airless spray systems, in general, operate at relatively low pressures—no higher than about 1,600 to 2,000 psi. While airless spray applications reduce the amount of volatile organic material which is released into the atmosphere, they generally do not atomize the coating as well as conventional air-based sprays and therefore the resulting finish coating is often not up to the standards for smoothness exhibited by air atomized spray coatings.

These two common types of spray systems are often combined to obtain a system which contains some of the benefits of both. In the so-called "air-assisted air spray system" a small amount, less than about 30 psi, of air is introduced into a airless system to improve its overall application properties.

Prior to 1970, the overwhelming majority of industrially-applied coatings were based on organic solvents with solid contents less than 30 percent. Due to environmental regulations, use of such coatings has dramatically decreased. In recent years, because of the continued need to reduce the amount of volatile organic materials contained in coatings, work has continued on developing systems which will permit the spraying of relatively high solids, high viscosity coating compositions. One approach has involved the so-called "Unicarb process" which employs carbon dioxide as a super critical liquid under heat and pressure in combination with a more conventional solvent for the coating. A device embodying this concept is described in Vol. 2, *High Solids Coating*, March, 1987 entitled, "Super Critical Fluid Processing of Polymers Used in High Solid Paints and Coatings." Among the disadvantages of the Unicarb process, the foremost is its extremely high cost and its complex operating procedures: individual spray units often cost between $50,000 and $100,000 and require frequent and costly maintenance. This system is disclosed for example in U.S. Pat. Nos. 5,027,742 and 5,009,367.

An added impetus to the search for coatings which contain lower amounts of volatile organic solvents has been the recent changes in air pollution standards adopted in several states, including primarily California, and the recent regulatory amendments proposed by the United States Environmental Protection Agency ("EPA"). In each case, the effect of these regulations is to limit the amount of volatile organic materials which may be present in a coating. In addition, the proposed EPA regulations prohibit or limit the use of 189 chemicals, many of which are solvents commonly used in the coatings industry. For this reason, these chemical solvents will either have to be substantially reduced or eliminated in future coatings.

Heretofore, the most widely employed solution to problems posed by governmental regulation of the volatile organic solvent content of coatings has been to switch to water as the solvent for the coating. However, particularly for high quality wood finishes, water-based coatings have an adverse effect on wood grain termed "grain raising." Moreover, the use of aqueous based systems to control volatile organic emissions is particularly difficult where there is the possibility of the presence of high humidity levels during drying which will make water evaporation difficult.

Coating compositions for application to substrates, particularly wood substrates, may be either thermoset or thermoplastic but, preferably, are thermoplastic coatings, particularly of a lacquer type. The materials most widely used with wood substrates are cellulosics, such as nitrocellulose. Traditionally, nitrocellulose lacquer coatings for wood substrates are made using an alcohol wet nitrocellulose. However, when such alcohol wet nitrocellulose is applied using a high pressure, high solids coating process, air entrainment frequently results and, in addition, the flow characteristics of the coatings are sometimes imperfect. Difficulties also occur when this coating is "dry sprayed" or sprayed at higher temperatures.

High pressure spray pumps have been known for many years. Among the manufacturers of such pumps, Graco, Speedflo, Nordson, Ransberg, and Wagner are included. Examples of high pressure spray systems include those disclosed in U.S. Pat. No. 3,816,028.

Most spray coating systems typically operate at less than about 2,000 psi. See, for example, U.S. Pat. Nos. 3,433,415 and 3,726,711. Graco has offered pumps for sale which operate at pressures ranging from 2,700 psi to 4,050 psi. However, there has been no disclosure of the use of these pumps in conjunction with the coating compositions of the type described herein.

U.S. patent application Ser. No. 07/722,260 generally discloses a process for preparing high quality, high solids coatings compositions using a high pressure airless spray system. Disclosed therein as the preferred type of coating composition for use in the system was an alcohol wet nitrocellulose lacquer. The instant invention involves a significant improvement over that prior art system. Specifically, according to the instant invention, the alcohol wetting agent is replaced with a plasticizer as described hereafter. As a result, the coating compositions of the instant invention exhibit less air entrainment in the lacquer upon application, greater tolerance for variations in film thicknesses, improved dry sprayability, and a greater temperature range at which the composition may be utilized, thus allowing the use of higher viscosity coatings.

Accordingly, it is an object of this invention to prepare a high quality, high solids coating composition that can be applied using a high pressure airless spray coating system by the disclosed process.

It is another object of this invention to prepare a high quality coating composition for wood furniture, cabinetry and related substrates by the disclosed process.

It is a still further object of this invention to prepare a coating composition which may be applied at high viscosity with a low volatile organic content by the disclosed process and which upon application maintains the coating characteristics of prior art systems which use conventional technology.

It is yet another object of this invention to prepare a coating composition which may be readily sprayable at temperatures of up to at least 150° F. and which may be applied by the disclosed process.

It is a still further object of this invention to prepare a coating composition which will meet the highest regulatory standards for volatile organic solvent amount and type and which may be applied by the disclosed process.

It is a still further object of this invention to prepare a coating composition comprised of a high solid nitrocellulose lacquer which can be applied by the disclosed process to a wood substrate to achieve high quality finishes.

It is a still further object of this invention to prepare a coating composition which is easy to apply using standard spray techniques.

It is a still further object of this invention to prepare a coating composition which may be applied by the disclosed process at a greater temperature range allowing the utilization of higher viscosity base coating products.

These and other objectives are obtained by preparing the coating compositions of the instant invention using the process described herein.

SUMMARY OF INVENTION

The instant invention involves a process for applying a coating composition for application to a substrate which can be applied using a high pressure airless spray which will achieve a high quality finish after the coating process is completed. This invention employs a coating composition which contains from about 3 to about 5 pounds per gallon of volatile organic materials and which coating maintains a viscosity in the range of about 250 cps to about 1,000 cps at temperatures in the range of about 65° F. to 150° F. In comparison, conventional spray applied lacquers have a volatile organic content range of about 5.6 to 6.2 pounds per gallon and are applied at a viscosity in the range of about 20 to about 100 cps. Preferably, the coating composition is prepared using a nitrocellulose lacquer prepared from a plasticized nitrocellulose material. According to the method of the instant invention, the composition described herein is introduced into the reservoir of a spray pump and the pump is provided with a means for maintaining the coating temperature in the range of about 65° F. to 150° F. during the spraying. Utilizing airless spray procedures, the pump applies the coating to the desired substrate at a pressure of at least 2,750 psi. After the remaining low levels of solvents are driven off, a finish coating results which is of comparable quality to prior art coatings obtained using conventional solvents and application techniques.

DETAILED DESCRIPTION OF INVENTION

The coating compositions to which the process of the instant invention is applicable are widely varied. The coatings may be either thermoset or thermoplastic; however, the preferred end use is in the thermoplastic coating area, particularly the lacquer area.

Among the coating materials which may be applied according to the process of the instant invention are polyesters, alkyds, acrylics, vinyls, cellulosics, amino resins and virtually any type of coating composition which may be rendered solvent soluble. However, the preferred coating compositions for use herein are coatings which are typically utilized on wood substrates, including particularly cellulosics such as nitrocellulose. The nitrocellulose lacquers can be made using several procedures. For example, the lacquer can be made in a traditional method using alcohol wet nitrocellulose. This process results in quantities of alcohols, such as isopropyl alcohol remaining in the coating composition. However, conventional nitrocellulose lacquer coatings using alcohols, such as isopropyl alcohol, when applied have certain deficiencies. When the coatings are applied at high hydraulic pressures (3,000 to 4,000 psi), air entrainment becomes a problem. Further, some of these coating compositions can only be applied with a restricted film thickness. In addition, because of these limitations on application, the procedures for application are more difficult, necessitating greater emphasis on proper spray techniques. Finally, the coatings using alcohol wet nitrocellulose can be sprayed only at temperatures up to about 100° F. This prevents the application of a number of high viscosity coatings and narrows the utilization of the composition.

Thus, in a preferred embodiment, the alcohol wet nitrocellulose is replaced by cellulose chips which have been plasticized, thus allowing the elimination of the alcohol from the final composition. The plasticizer for the nitrocellulose can be any of the well known plasticizers such as dibutyl phthalate, camphor, N-ethylbenzenesulfonamide, butyl benzyl phthalate, tricresyl phosphate and other known plasticizers. Dibutyl phthalate is the preferred plasticizer.

The substrates to which the coating may be applied are equally varied. For example, the coatings may be applied to wood, metal, plastic, paper or the like. However, the process of the instant invention is particularly applicable in the industrial wood finishing area where extremely high quality coatings are desired.

Among the solvents which may be utilized in the process of the instant invention are included a wide variety of solvents typically used in coatings end uses. Included are aromatic and aliphatic hydrocarbon solvents, esters, ethers, mixed ester-ethers, ketones, alcohols, and the like. With nitrocellulose lacquers the preferred solvent is a ketone.

In the preferred system for carrying out the process of the instant invention, it has surprisingly been discovered that methyl amyl ketone, a solvent not included on the recently published EPA list, and a solvent which has typically been exempt under the most stringent air pollution control regulations, provides the desired balance of viscosity stability, evaporation rate, and other properties necessary to produce a high quality finish coating with a nitrocellulose lacquer.

The coating compositions of the instant invention may be compounded with conventional solvents, fillers, binders, extenders, pigments, diluents, flow control agents, flatting agents, or surfactants, and the like which are normally necessary to form typical coating compositions.

It is important that the coating compositions of the instant invention be viscosity stable over the operating temperatures which are employed in the method of the instant invention. Accordingly, the coating compositions should exhibit a viscosity at temperatures ranging from about 65° F. to 150° F. in the range of about 250 to 1,000 cps, preferably 500 to 800 cps. At the same time, it is essential that the spray mechanism described hereafter provide stable temperature and pressure ranges to ensure that a stable viscosity in the sprayed coating is obtained. In the event viscosity stability is not provided by a combination of the coating which is selected and the spray mechanism which is utilized, poor spray properties will be obtained.

Accordingly, if the coating composition is permitted to rise in temperature such that the effective spray viscosity is significantly reduced, the coating will tend to trap air and sag uncontrollably. On the other hand, if viscosity build-up is too rapid, as the temperature is reduced, the coating will no longer atomize properly and ultimately simply will not spray, or if it does spray, will not properly flow and level after application. For these reasons, the spray mechanism of the instant invention is provided with a temperature control means to ensure that the temperature is maintained in the range of about 65° F. to 150° F.

It has been surprisingly discovered that the tendency of some of the coating compositions to trap air and sag uncontrollably can be reduced by the choice of the nitrocellulose material. Conventional wet alcohol nitrocellulose lacquers tend to trap air when the temperature of the spray mechanism rises above 120° F. Further, when high hydraulic pressures (3,000 to 4,000 psi) is applied, there may be air entrainment regardless of the temperature of application. It has been surprisingly discovered that these problems can be eliminated when nitrocellulose chips which are comprised of nitrocellulose and a plasticizer, preferably dibutyl phthalate, are substituted. The amount of air entrapment is significantly reduced. In addition, the thickness of the film when applied is not as critical because of the improved flow characteristics. Finally, higher temperatures of application can be used up to at least about 150° F. and still achieve excellent results.

While the range of percent non-volatile can vary widely, the instant invention on the whole will permit a minimum of about a 10 to 30 percent solvent reduction based on the total system weight. With nitrocellulose lacquers, the solids content according to the instant invention should be in the range of about 35 to about 60 percent non-volatile, preferably about 40 to about 50 percent nonvolatile. This is to be compared with prior art, conventional sprayable nitrocellulose lacquers which have a solids contents in the range of about 20 to about 30 percent. Regardless of what type of coating composition is chosen, in general, the solids content will be in excess of about 35 percent non-volatile by weight. Measured in another fashion the volatile organic compound of the coatings of the instant invention will range from about 3 to about 5 pounds per gallon.

The preferred pump for use in the instant invention is an airless pump having an output to input ratio in the range of at least 30 to 1, preferably at least 40 to 1. In general, the pump should operate at a minimum fluid pressure of at least 2,750, preferably at least about 3,000, and most preferably above 3,500 psi. The pump should be provided with a temperature control means such as a heater, heating jacket, refrigeration means or any combination thereof, to ensure that the coating material which is pumped is maintained in the preferred operating temperature range described above, i.e., preferably about 65° F. to about 150° F. Preferably the pump should have a delivery rate in the range of about 2 to 6 gallons per minute. The spray nozzles which are useful for applying the coatings of the instant invention should have an orifice size in the range of about 7/1000 to about 20/1000 of an inch with a fan pattern size of 5 to 15 inches. In addition, the pump can be equipped with a runaway valve which prevents the rapid pumping as a result of cavitation within the pump cylinder. In the alternative, the pump can be equipped with a fluid level control valve to prevent air from entering the system and causing cavitation. Among the pumps which meet the standards described above is the King 45:1 ratio pump, available from Graco, Inc., Minneapolis, Minn.

The coating composition of the instant invention should be applied preferably to a wet film thickness in the range of about 2 mils to about 8 mils, preferably about 3 mils to about 5 mils. After application the coating composition of the instant invention, depending upon the solvents employed and the particular polymer, it should be subject to a dry or curing cycle which ranges in temperature depending upon the solvents and the coatings which have been chosen. In general, with lacquers, the preferred temperatures are in the range of about 60° F. to about 180° F., preferably about 70° F. to about 150° F. The drying and/or curing process is carried out in order to remove substantially all of the solvent from the coating composition.

EXAMPLE 1

The following were blended on a paddle mixer and added to the hold tank of a Graco Model King 45:1 ratio high pressure sprayer having a severe duty pump, high pressure filter, and drain valve: 8.7 parts of blown soy oil plasticizer, 8.7 parts of dioctyl phthalate plasticizer; 7.78 parts of a 99 percent (1 percent solids) by weight xylene reduction of General Electric SF 69; 0.12 parts of polyvinyl isobutyl ether dissolved in xylene; 40.0 parts of methyl amyl ketone; 25.7 parts of 30/35 centipoise nitrocellulose at 70 percent solids by weight in isopropanol; 8.7 parts of a maleic modified ester gum hard resin available from Union Camp/Union Carbide as Filtrez 339 and 0.3 parts of silica flatting agent. The coating exhibited a viscosity of 600 cps, a solids by weight of 44.58 percent, and a volatile organic compound content of 4.43 pound per gallon.

Poplar wood based bedroom furniture including beds, bedstands and dressers were first prepared using conventional coating steps. Initially a Gravure printing ink was applied, followed by a spray applied toner, sealer, and wiping stain. The resulting coated furniture was then sprayed with the top coat lacquer described above.

The spray gun on the King 45:1 sprayer was equipped with a standard 0.015 orifice with an 8 to 10 inch fan spray pattern. During spraying temperature was maintained at approximately 90° F. Spray pressure was maintained at 3,600 psi. The above described coating was spray applied to a wet film thickness of approximately 4 mils and the coated furniture pieces were then flashed dried at ambient for 43 minutes followed by a 11¾ minute dry at 120° F. to 130° F. The above described coating was as readily applied as was the prior art conventional spraying system. Flow and leveling were also up to prior art standards. Film build, however, was significantly higher than with prior art systems. Whereas, in the prior art two coats were necessary to obtain the desired film build utilizing a coating system having a percent solids content of about 28 percent using the above coating which exhibits a solids content of about 44 weight percent, it was possible to obtain with a single spray pass a higher film build than with prior art two coat systems. In addition, because the coating of the instant invention is applied at higher viscosity and solids, less film penetration of the wood substrate is achieved thereby permitting a higher film build. Finally, as pointed out above, because the above coating exhibited a volatile organic compound content of about 4.43 pounds per gallon, the coating gave off less than 50 percent of the amount of volatile organic compounds given off by the standard prior art coating composition.

After drying the coating of the instant invention exhibited coating properties which were equivalent to those of prior art coatings applied using conventional application techniques.

EXAMPLE 2

The following were blended on a paddle mixer and added to the holding tank of a Graco Model King 45:1 ratio high pressure sprayer having a severe duty pump, high pressure filter, and drain valve: 5.0 parts of dioctyl pthalate plasticizer; 0.45 parts of a DC-200 silicone solution with 1 percent solids by weight in toluene manufactured by Dow Corning; 58.3 parts of methyl amyl ketone; 20.0 parts of nitrocellulose chips at 100 percent solids by weight in dibutyl phthalate, and 8.0 parts of maleic modified ester gum hard resin available from Union Camp/Union Carbide as Filtrez 339. The coating exhibited a viscosity of 1000 cps, a solids by weight of 42 percent and a volatile organic compound content of 4.6 pounds per gallon.

Poplar wood based bedroom furniture including beds, bedstands and dressers were first prepared using conventional coating steps. Initially a Gravure printing ink was applied, followed by a spray applied toner, sealer, and wiping stain. The resulting coated furniture was then sprayed with the top coat lacquer described above.

The spray gun on the King 45:1 sprayer was equipped with a standard 0.015 orifice with an 8 to 10 inch fan spray pattern. During spraying temperature was maintained at approximately 90° F. Spray pressure was maintained at 3000 psi. The above described coating was spray applied to a wet film thickness of approximately 4 mils and the coated furniture pieces were then flashed dried at ambient for 25 minutes followed by a 35 minute dry at 105° F. to 130° F. The above described coating was as readily applied as was the prior art conventional spraying system. Flow and leveling were also up to prior art standards. Film build, however, was significantly higher than with prior art systems. Whereas, in the prior art two coats were necessary to obtain the desired film build utilizing a coating system having a percent solids content of about 21 percent using the above coating which exhibits a solids content of about 42 weight percent, it was possible to obtain with a single spray pass a higher film build than with prior art two coat systems. In addition, because the coating of the instant invention is applied at higher viscosity and solids, less film penetration of the wood substrate is achieved thereby permitting a higher film build. Finally, as pointed out above, because the above coating exhibited a volatile organic compound content of about 4.6 pounds per gallon, the coating gave off less than 50 percent of the amount of volatile organic compounds given off by the standard prior art coating composition.

After drying the coating of the instant invention exhibited coating properties which were equivalent to those of prior art coatings applied using conventional application techniques.

What is claimed is:

1. A process for applying a high quality, leveling finish coat to a substrate which comprises:
    (a) forming a nitrocellulose coating in a liquid organic solvent wherein said coating has a solids content in excess of about 35 percent non-volatile by weight wherein said nitrocellulose coating is prepared from a plasticized nitrocellulose;
    (b) without further addition of solvents, introducing the coating into a reservoir of a high pressure airless spray unit having a compression ratio of at least about 30 to 1 and providing a minimum fluid pressure in the range of at least about 2,750 psi, said airless spray unit being provided with a pump and a means for controlling the temperature of the coating within the range of about 65° F. to about 150° F. wherein the viscosity of the coating is maintained in the range of about 250 to 1,000 cps at the operating temperature range of the pump;
    (c) without further addition of solvents, applying the coating to the substrate to be coated; and
    (d) removing substantially all of the solvent from the coating.

2. The process of claim 1 wherein the substrate is wood.

3. The process of claim 1 wherein the solids content of the nitrocellulose coating is in the range of about 35 to 60 percent non-volatile by weight.

4. The process of claim 3 wherein the solvent for the nitrocellulose coating is a ketone.

5. The process of claim 4 wherein the ketone is methyl amyl ketone.

6. The process of claim 1 wherein the volatile organic content of the coating is in the range of about 3 to 5 pounds per gallon.

7. The process of claim 6 wherein the volatile organic content is in the range of about 4 to 5 pounds per gallon.

8. The process of claim 1 wherein the plasticizer utilized with the plasticized nitrocellulose is dibutyl phthalate.

9. The process of claim 1 wherein the high pressure airless spray unit is an air-assisted airless spray unit.

* * * * *